US005251219A

United States Patent [19]

Babb

[11] Patent Number: 5,251,219

[45] Date of Patent: Oct. 5, 1993

[54] ERROR DETECTION AND CORRECTION CIRCUIT

[75] Inventor: Brendan J. Babb, Anchorage, Ak.

[73] Assignee: Advanced Micro Devices, Inc., Sunnyvale, Calif.

[21] Appl. No.: 579,721

[22] Filed: Sep. 10, 1990

[51] Int. Cl.[5] .......... G06F 11/10

[52] U.S. Cl. .......... 371/37.4; 371/37.7

[58] Field of Search .......... 371/37.4, 37.2, 37.7

[56] References Cited

U.S. PATENT DOCUMENTS

| | | | |
|---|---|---|---|
| 4,495,623 | 1/1985 | George et al. | 371/37.4 |
| 4,688,225 | 8/1987 | Fukami et al. | 371/37.4 |
| 4,760,576 | 7/1988 | Sako | 371/37.4 |
| 4,958,350 | 9/1990 | Worley, III et al. | 371/37.4 |
| 5,068,855 | 11/1991 | Kashida et al. | 371/37.4 |

OTHER PUBLICATIONS

Peterson et al., Error Correcting Codes, 2nd Edition, The MIT Press, ©1972.

*Primary Examiner*—Robert W. Beausoliel, Jr.
*Assistant Examiner*—Allen M. Lo
*Attorney, Agent, or Firm*—William J. Benman, Jr.

[57] ABSTRACT

The present invention (10) substantially overcomes many of the problems associated with prior art error detection codes by providing a novel approach to detecting and correcting multiple bit errors. The invention (10) organizes the data word into a matrix of n by m bits, where n is the number of m bit groups. Parity bits are generated for each column and each row and used to detect single, double and triple bit errors.

15 Claims, 4 Drawing Sheets

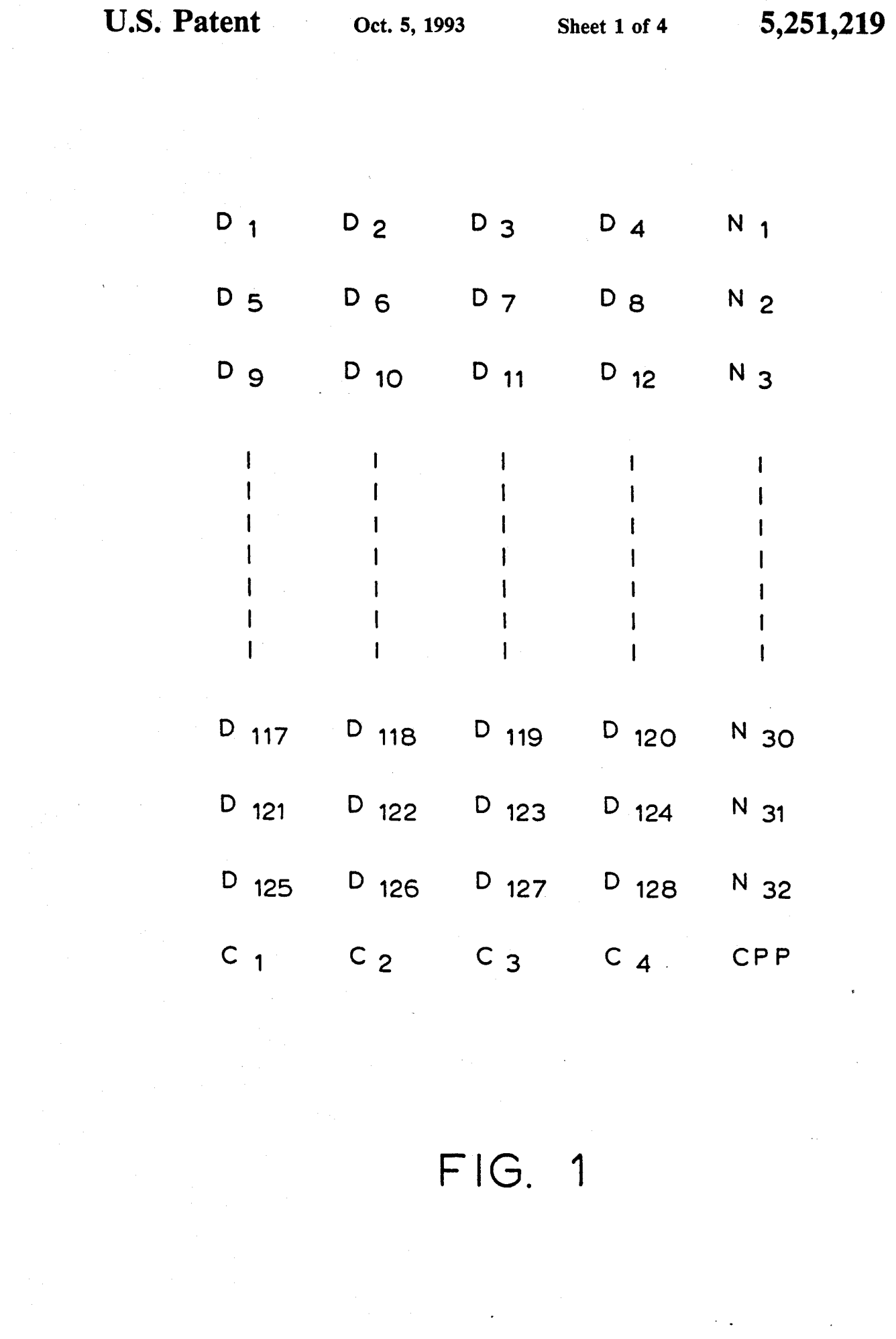

| | | | | |
|---|---|---|---|---|
| $D_1$ | $D_2$ | $D_3$ | $D_4$ | $N_1$ |
| $D_5$ | $D_6$ | $D_7$ | $D_8$ | $N_2$ |
| $D_9$ | $D_{10}$ | $D_{11}$ | $D_{12}$ | $N_3$ |
| $D_{117}$ | $D_{118}$ | $D_{119}$ | $D_{120}$ | $N_{30}$ |
| $D_{121}$ | $D_{122}$ | $D_{123}$ | $D_{124}$ | $N_{31}$ |
| $D_{125}$ | $D_{126}$ | $D_{127}$ | $D_{128}$ | $N_{32}$ |
| $C_1$ | $C_2$ | $C_3$ | $C_4$ | CPP |

FIG. 1

ERROR DETECTION AND CORRECTION CIRCUIT

BACKGROUND OF THE INVENTION

1. Field of the Invention

The present invention relates to error detection and correction codes. More specifically, the present invention relates to multiple error detection and correction matrix codes.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

A typical memory chip is a square array of data-storage cells. The 64K chip, for example, consists of an array of 256 by 256 data-storage cells. Each cell stores one bit, a 0 or a 1. The 0's and 1's stored in a memory chip are represented by the presence or absence of negative electric charge at sites in the silicon crystal. When a 0 is to be stored in a given cell, the potential well at the site is filled with electrons. When a 1 is to be stored, the well is emptied of electrons. When the cell is read, its negative charge is measured. If the charge exceeds a certain value, the stored bit is declared to be a 0, otherwise it is declared to be a 1.

Errors can occur when a cell loses its charge, or if an uncharged potential well acquires a charge. Hard errors occur when a given cell is stuck at 0 or stuck at 1 or toggling between 0 and 1.

Error correcting codes help correct most errors that occur when data is stored or read from computer memories. Error correcting codes, such as the Hamming Code, group data bits together with parity bits into a code word using an encoding algorithm. The parity bits act as checks for the data bits. Errors occurring in storing or reading of data bits from the computer memory are detected and corrected with a decoding algorithm.

Presently available high speed error detection and correction (EDC) chips for memory to CPU application perform single error correction/double error detection (SEC/DED). Many three and four bit errors are either ignored or miscorrected by these SEC/DED devices resulting in erroneous data. Chips which use polynomial or cyclic codes can detect these errors but are too slow for real time operation. For this reason there is a need in the art for an improved error correcting code.

SUMMARY OF THE INVENTION

The present invention substantially overcomes many of the problems associated with prior art error detection codes by providing a novel approach to detecting and correcting multiple bit errors. The invention is a system which organizes the data word into a matrix of n by m bits, where n is the number of m bit groups. Parity bits are generated for each column and each row. Single bit errors are detected and corrected. Double and triple bit errors are detected.

BRIEF DESCRIPTION OF THE DRAWINGS

FIG. 1 shows a matrix structure generated from a 128 bit data word.

DESCRIPTION OF THE INVENTION

Illustrative embodiments and exemplary applications will now be described with reference to the accompanying drawings to disclose the advantageous teachings of the present invention.

The present invention is a system which organizes k bit data words into a matrix structure consisting of $n+1$ rows and $m+1$ columns, where k is the product of n and m. An illustrative matrix 8 is shown in FIG. 1 for a 128 bit data word. The matrix 8 consists of the 128 data bits $D_1$–$D_{128}$ in 32 rows of 4 data bits each, parity bits $N_1$–$N_{32}$, and column parity bits $C_1$–$C_4$ and CPP. Nibble parities $N_1$ through $N_{32}$ are generated by adding the 4 data bits in each row. An even number may be represented by a 0 for the nibble parity, whereas an odd number is represented by a 1 for the nibble parity. The column parity bits $C_1$ through $C_4$ are generated by adding the 32 data bits in each column. Again, an even number may be represented by a 0 and an odd number may be represented by a 1. The column parity parity CPP is generated in the same manner by adding the column parities $C_1$ through $C_4$.

Figure 2:
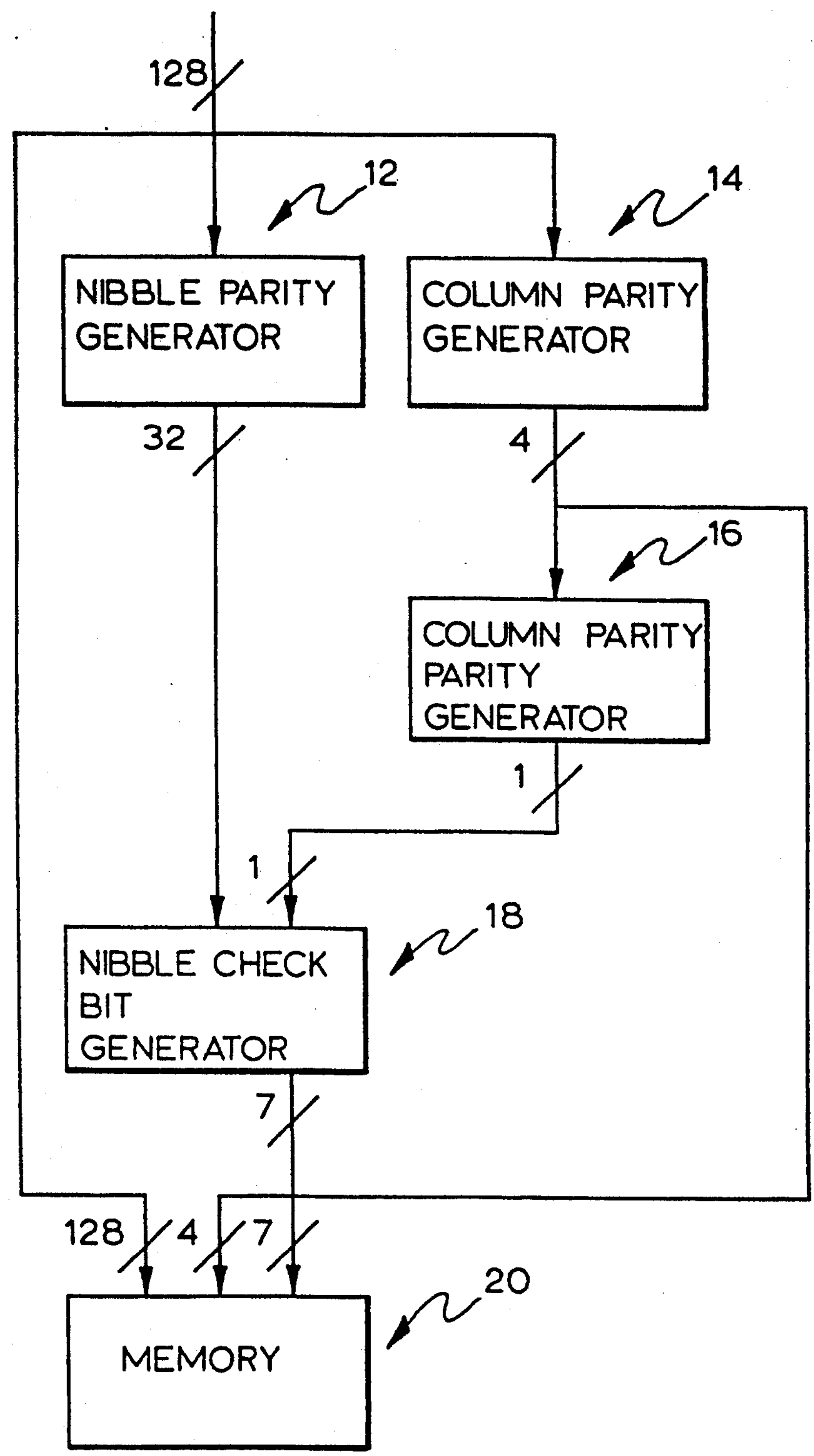
FIG. 2 shows a block diagram of an illustrative implementation of a 128 bit data word parity bit encoder constructed in accordance with the teachings of the present invention.

FIG. 2 shows a block diagram of an illustrative implementation of a 128 bit data word parity bit encoder constructed in accordance with the teachings of the present invention. In the preferred embodiment, the encoder 10 consists of a nibble parity generator 12 which outputs 32 nibble parity bits $N_1$–$N_{32}$, and a column parity generator 14 which outputs the 4 column parity bits $C_1$–$C_4$, in response to an input of 128 data bits. The nibble parity generator 12 adds data bits in each row and outputs a "1" for a nibble parity bit if the sum is odd or a "0" if the sum is even. The column parity generator 14 adds data bits in each column and outputs a "1" for a column parity bit if the sum is odd and a "0" if the sum is even. In the preferred embodiment, the nibble parity generator 12 may be implemented by 32 4-bit exclusive-OR (XOR) gates (not shown) generating nibble parities and the column parity generator 14 may be implemented by 4 32-bit XOR gates (not shown) generating column parities. By definition, the XOR gate is enabled only when an odd number of 1's appear at the inputs. The 4 column parities are input into a column parity parity bit generator 16 which may be implemented by a 4-bit XOR gate to generate a 33rd nibble parity which is input to a nibble check bit generator 18 along with the first 32 nibble parities. The nibble check bit generator 18 outputs 7 nibble check bits which are stored in a memory chip 20 along with the 128 bits of data and the 4 column parity bits. In the preferred embodiment, the nibble check bit generator may be implemented by a 33 bit modified hamming code.

Figure 3:
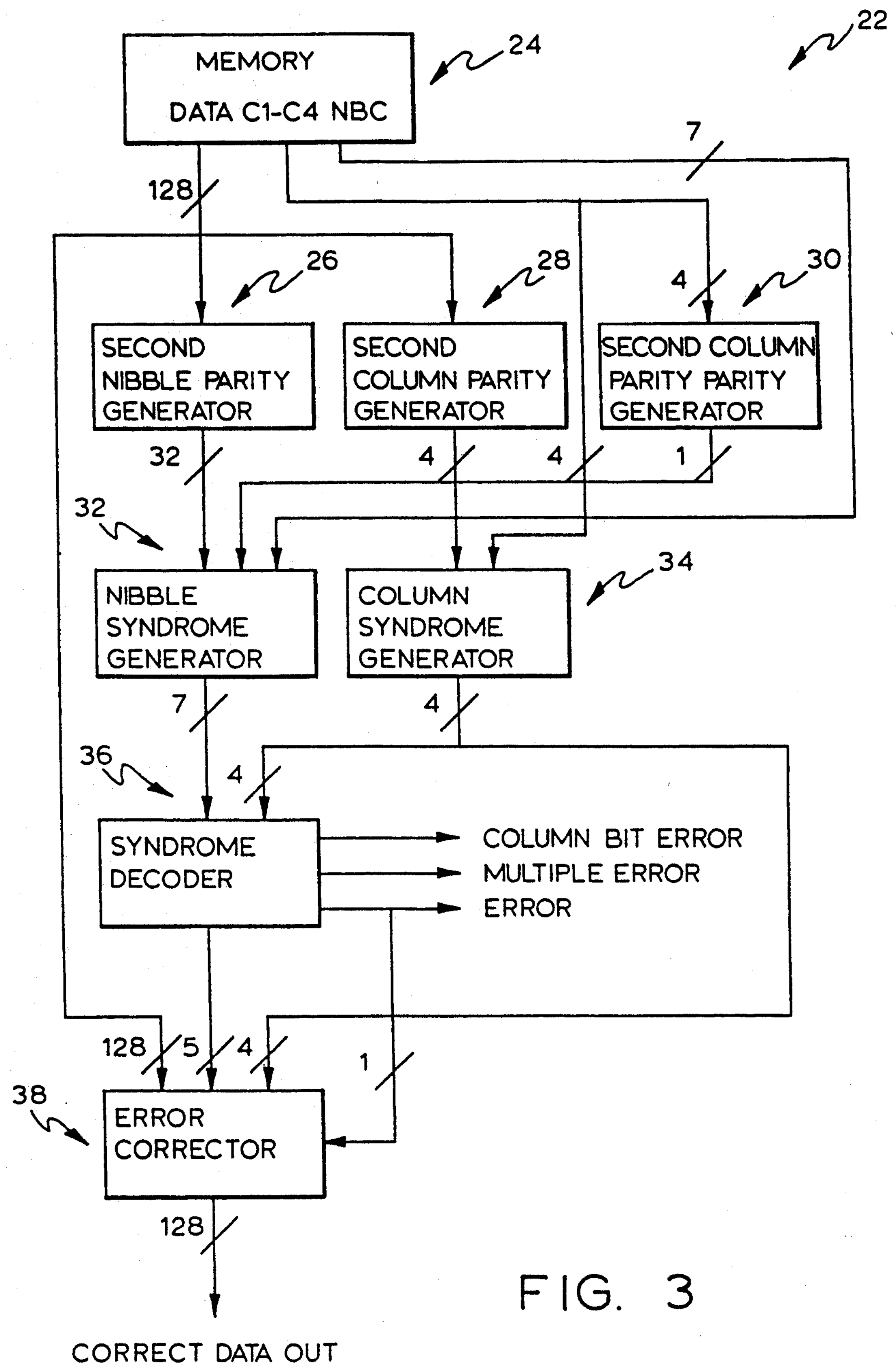
FIG. 3 shows a block diagram of an illustrative implementation of a 128 bit data word decoder constructed in accordance with the teachings of the present invention.

FIG. 3 shows a block diagram of an illustrative implementation of a 128 bit data word decoder constructed in accordance with the teachings of the present invention. In the preferred embodiment, the 128 bit data word decoder 22 consists of a memory chip 24 which receives and stores the encoded data, i.e., the 128 bit data word, 4 column parity bits, and 7 nibble check bits from the data encoder 10. The 128 bit data word is output to a second nibble parity generator 26 and a second column parity generator 28 which generate 32 new nibble parities and 4 new column parities. The nibble parity generator 12 and the column parity generator 14 of the data encoder 10 may be used with appropriate switching circuitry to provide the 32 new nibble parities and the 4 new column parities. Nibble parities and column parities are generated in the same manner as in the data encoder 10.

The 4 column parity bits from the memory chip 24 are input to a second column parity parity generator 30 and the output is input to a nibble syndrome generator 32 along with the 32 new nibble parities and the 7 nibble check bits stored in the memory chip 24.

The nibble syndrome decoder 32 generates 7 new nibble check bits from the 32 new nibble parities and the new column parity parity bit, and compares the 7 newly generated nibble check bits to the 7 nibble check bits from the memory chip 24. Seven nibble syndrome bits are generated by the nibble syndrome decoder 32 by XORing the 7 new nibble check bits to the nibble check bits from the memory chip 24. In a similar manner, the 4 new column parity bits are XORed with the 4 column parity bits from the memory chip 24 in a column syndrome generator 34 which outputs 4 column syndrome bits. In the preferred embodiment of the 128 bit data word decoder 22, the nibble syndrome decoder 32 consists of a nibble check bit generator (not shown) and 7 2-bit XOR gates (not shown). The column syndrome generator 34 may be implemented by 4 2-bit XOR gates (not shown). The XOR gate outputs a "1" indicating an error when the inputs are different and outputs a "0" indicating no error when the inputs are the same. The 7 nibble syndrome bits and the 4 column syndrome bits are then input to a syndrome decoder 36. In the event the syndrome decoder 36 detects an error, an error corrector 38 shifts over a number of nibbles to the erroneous bit and corrects the error.

Figure 4:
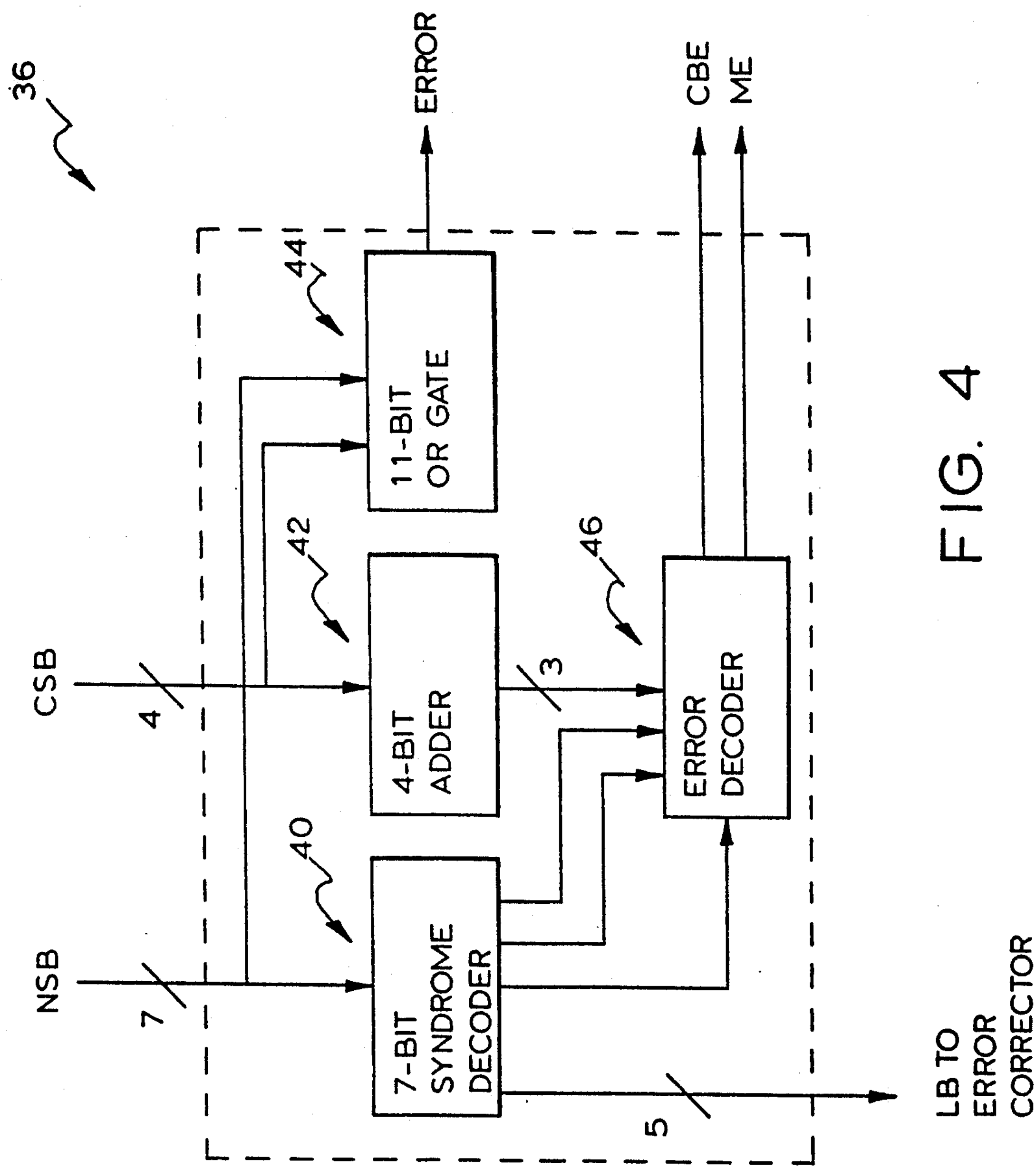
FIG. 4 shows a block diagram of an illustrative implementation of a syndrome decoder constructed in accordance with the teachings of the present invention.

FIG. 4 shows a block diagram of an illustrative implementation of the syndrome decoder 36 constructed in accordance with the teachings of the present invention. The syndrome decoder 36 may be implemented by a 7-bit syndrome decoder 40, a 4-bit adder 42, an 11-bit OR gate 44, and an error decoder 46. The 7-bit syndrome decoder 36 uses a decode matrix to locate which nibble is in error or if a multiple error has occurred. The 4-bit adder 42 detects the number of 1's in the column syndrome bits and outputs either none, one, or multiple error. The error decoder 46 is a state machine which uses the outputs from the 7-bit syndrome decoder 40 and the number of column errors to decide what type of error occurred. The 11 bit OR gate 44 detects any 1's present in the 7 nibble syndrome bits and the 4 column parity bits. Inputs to the 11-bit OR gate 44 come directly from the column syndrome generator 34 and the nibble syndrome generator 32. A "0" output indicates all 0's and no detectable data errors in the data word and the 128 bit data word is outputted.

The error decoder 46 operates as follows:

If a single error is indicated in the 33rd bit then this means an error in nibble 32 which is a 4 column parity bit error or a syndrome check bit error. This causes Error Decoder to send CBE high but the error is not corrected.

If a multiple error is indicated by the 7 bit syndrome decoder or if the 4 bit adder indicates a multiple error then ME on the error decoder is sent high. The multiple error can not be corrected.

If a single bit error is indicated by the 7 bit syndrome decoder and 0 errors are indicated by the 4 bit adder then a multiple bit error has occurred and ME is sent high. The multiple error cannot be corrected.

If the 7 bit syndrome decoder indicates no error and the 4 bit adder indicates 1 error then a multiple bit error has occurred and ME is sent high. The multiple error can not be corrected.

If a single nibble error is indicated by the 7 bit syndrome decoder (part 40) and the 4 bit adder indicates (part 42) one column error then the error decoder changes nothing and only error from (part 44) is high. The error corrector corrects only if error is high and multiple error (ME) is low and check bit error (CBE) is low. The error corrector 38 uses the CSB (column syndrome bit) to shift over to an erroneous bit and correct the error.

Thus, the present invention has been described herein with reference to a particular embodiment for a particular application. Those having ordinary skill in the art and access to the present teachings will recognize additional modifications applications and embodiments within the scope thereof. For example, the invention is not limited to a specific number of data bits that can be encoded and decoded. The matrix can be expanded or compressed to handle a different number of data bits.

Further, the invention is not limited to the technique by which the desired logic is generated. Functionally equivalent logic may be used wherever applicable. In some cases, reverse logic may be implemented.

It is therefore intended by the appended claims to cover any and all such applications, modifications and embodiments within the scope of the present invention.

Accordingly, what is claimed is:

1. A system for detecting and correcting errors in a k bit data word comprising:

an encoder circuit for providing an error detecting and correcting code comprising:

first nibble parity generator means for converting said k bit data word into a first n by m matrix having n rows and m columns, each row having one m bit nibble of data from said data word and $n \times m$ being equal to k and for generating a first respective parity bit across each of said n nibbles;

first column parity generator means for generating a first column parity bit for each of the m columns of said matrix;

first column parity parity generator means for generating a column parity parity bit in response to said column parity bits; and nibble check bit generator means responsive to said first nibble parity generator means and said first column parity parity generator means for generating a plurality of nibble check bits and a decoder circuit for decoding said error detecting and correcting code comprising second nibble parity generator means for converting said k bit data word into a second n by m matrix having n rows and m columns, each row having one m bit nibble of data from said data word and n×m being equal to k and for generating a second respective parity bit across each of said n nibbles;

second column parity generator means for generating a second column parity bit for each of the m columns of said matrix;

second column parity parity generator means for generating a column parity parity bit in response to said first column parity bits;

nibble syndrome generator means responsive to said nibble check bits and said second column parity parity generator means bits for comparing said nibble bits generated by first nibble parity generator means to respective nibble parity bits generated by said second nibble parity generator means and providing nibble syndrome bits in response thereto;

column syndrome generator means for comparing said first column parity bits to said second column parity bits and providing column syndrome bits in response thereto; and syndrome decoder means for detecting errors in said data work in response to said nibble syndrome bits and said column syndrome bits and providing error detection signals in response thereto.

2. The invention of claim 1 wherein said syndrome decoder means includes a syndrome decoder connected to said nibble syndrome generator means for providing error signals in response to the output thereof.

3. The invention of claim 2 wherein said syndrome decoder means further includes an adder connected to said column syndrome generator means for detecting column errors.

4. The invention of claim 3 wherein said syndrome decoder means includes an OR gate connected to said nibble syndrome generator means and said column syndrome generator means for providing an output indicating the detection of an error in said data word.

5. The invention of claim 3 wherein said syndrome decoder means includes an error decoder responsive to the output of said syndrome decoder and said adder for indicating a check bit error or a multiple error.

6. The invention of claim 5 wherein said error decoder is a state machine.

7. The invention of claim 1 including error correcting means for correcting an error in a bit of said data word in response to the output of said syndrome decoder means.

8. A system for detecting and correcting errors in a k bit data word including:

an encoder circuit for providing an error detecting and correcting code, said encode circuit comprising:

first nibble parity generator means including an exclusive OR circuit for converting said k bit data word into a first n by m matrix having n rows and m columns, each row having one m bit nibble of data from said data word and n×m being equal to k and for generating a first respective parity bit across each of said n nibbles;

first column parity generator means including an exclusive OR circuit for generating a first column parity bit for each of the m columns of said matrix;

first column parity parity generator means including an exclusive OR circuit for generating a column parity parity bit in response to said column parity bits; and a nibble check bit generator connected to said first nibble parity generator means and said first column parity parity generator means for generating a plurality of nibble check bits and a decoder circuit for decoding said error detecting and correcting code, said decoder circuit comprising:

second nibble parity generator means including an exclusive OR circuit for converting said k bit data word into a second n by m matrix having n rows and m columns, each row having one m bit nibble of data from said data word and n×x being equal to k and for generating a second respective parity bit across each of said n nibbles;

second column parity generator means including an exclusive OR circuit for generating a second column parity bit for each of the m columns of said matrix;

second column parity parity generator means including an exclusive OR circuit for generating a column parity parity bit in response to said first column parity bits; and a nibble syndrome generator responsive to said nibble check bits and said second column parity parity generator means bits for comparing said nibble bits generated by first nibble parity generator means to respective nibble parity bits generated by said second nibble parity generator means and providing nibble syndrome bits in response thereto.

9. The invention of claim 8 wherein said decoder circuit further includes column syndrome generator for comparing said first column parity bits to said second column parity bits and providing column syndrome bits in response thereto.

10. The invention of claim 9 wherein said decoder circuit further includes syndrome decoder means for detecting errors in said data word in response to said nibble syndrome bits and said column syndrome bits and providing error detection signals in response thereto.

11. The invention of claim 10 wherein said syndrome decoder means includes a syndrome decoder connected to said nibble syndrome generator for providing error signals in response to the output thereof.

12. The invention of claim 11 wherein said syndrome decoder means further includes an adder connected to said column syndrome generator for detecting column errors.

13. The invention of claim 12 wherein said syndrome decoder means includes an OR gate connected to said nibble syndrome generator and said column syndrome generator for providing an output indicating the detection of an error in said data word.

14. The invention of claim 13 wherein said syndrome decoder means includes an error decoder responsive to the output of said syndrome decoder and said adder for indicating a check bit error or a multiple error.

15. The invention of claim 10 including error correcting means for correcting an error in a bit of said data word in response to the output of said syndrome decoder means.

* * * * *